(12) United States Patent
Brusarosco et al.

(10) Patent No.: US 9,043,112 B2
(45) Date of Patent: *May 26, 2015

(54) METHOD AND SYSTEM FOR SIGNALING AN AQUAPLANING CONDITION OF A TYRE FITTED ON A VEHICLE

(75) Inventors: Massimo Brusarosco, Milan (IT); Federico Mancosu, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 1008 days.

This patent is subject to a terminal disclaimer.

(21) Appl. No.: 13/125,439

(22) PCT Filed: Oct. 22, 2009

(86) PCT No.: PCT/IB2009/054673
§ 371 (c)(1), (2), (4) Date: Apr. 21, 2011

(87) PCT Pub. No.: WO2010/046871
PCT Pub. Date: Apr. 29, 2010

(65) Prior Publication Data
US 2011/0199201 A1    Aug. 18, 2011

Related U.S. Application Data

(60) Provisional application No. 61/202,063, filed on Jan. 26, 2009.

(30) Foreign Application Priority Data

Oct. 24, 2008 (IT) .............................. MI2008A1888

(51) Int. Cl.
*B60T 8/172* (2006.01)
(52) U.S. Cl.
CPC ........... *B60T 8/1725* (2013.01); *B60T 2210/13* (2013.01); *B60T 2240/04* (2013.01)

(58) Field of Classification Search
CPC . B60T 2210/13; B60T 2240/04; B60T 8/172; B60T 8/1725
USPC .............................................. 701/82; 340/438
See application file for complete search history.

(56) References Cited

U.S. PATENT DOCUMENTS

| 5,864,056 A | 1/1999 | Bell et al. |
| 6,278,361 B1 | 8/2001 | Magiawala et al. |

(Continued)

FOREIGN PATENT DOCUMENTS

| EP | 1 106 397 A2 | 6/2001 |
| EP | 1 498 291 A1 | 1/2005 |

(Continued)

OTHER PUBLICATIONS

International Search Report from the European Patent Office for International Application No. PCT/IB2009/054673, mailing date Mar. 5, 2010.

(Continued)

*Primary Examiner* — John Q Nguyen
*Assistant Examiner* — Nadeem Odeh
(74) *Attorney, Agent, or Firm* — Finnegan, Henderson, Farabow, Garrett & Dunner, L.L.P.

(57) ABSTRACT

A method of signalling an aquaplaning condition of a tire, the latter rolling on a rolling surface, a footprint area being defined between the tire and the rolling surface, a layer of water being interposed between the tire and the rolling surface, includes: detecting a first signal representative of a deformation of the tire due to rolling of the tire on the rolling surface, the first signal including at least one portion representative of the interaction between the tire and the layer of water; processing the first signal so as to determine a parameter representative of an aquaplaning condition of the tire as a function of the first signal; and generating a notification signal as a function of the at least one parameter. A system for signalling an aquaplaning condition of a tire.

14 Claims, 8 Drawing Sheets

(56) References Cited

U.S. PATENT DOCUMENTS

| | | |
|---|---|---|
| 6,959,593 B2 | 11/2005 | Mancosu et al. |
| 7,168,308 B2 | 1/2007 | Mancosu et al. |
| 7,451,024 B2 | 11/2008 | Brusarosco et al. |
| 8,775,017 B2 | 7/2014 | Brusarosco et al. |
| 2002/0162389 A1* | 11/2002 | Yokota et al. ................ 73/146 |
| 2004/0064219 A1 | 4/2004 | Mancosu et al. |
| 2005/0076985 A1* | 4/2005 | Colombo et al. ........ 152/209.18 |
| 2005/0150284 A1 | 7/2005 | Hernando et al. |
| 2005/0204806 A1 | 9/2005 | Brusarosco et al. |
| 2005/0234613 A1 | 10/2005 | Brusarosco et al. |
| 2007/0113635 A1 | 5/2007 | Corniot |
| 2008/0015763 A1 | 1/2008 | Kitazaki et al. |
| 2008/0027658 A1 | 1/2008 | Ichikawa et al. |
| 2008/0103659 A1 | 5/2008 | Mancosu et al. |
| 2009/0115590 A1 | 5/2009 | Brusarosco et al. |

FOREIGN PATENT DOCUMENTS

| | | |
|---|---|---|
| EP | 1 759 891 A1 | 3/2007 |
| EP | 1 878 596 A2 | 1/2008 |
| JP | 2007-153034 | 6/2007 |
| WO | WO 03/082644 A1 | 10/2003 |
| WO | WO 2006/034731 A1 | 4/2006 |
| WO | WO 2008/065465 A1 | 6/2008 |
| WO | WO 2010/046872 A1 | 4/2010 |

OTHER PUBLICATIONS

International Preliminary Report on Patentability for International Application No. PCT/IB2009/054673 dated Apr. 26, 2011.

* cited by examiner

METHOD AND SYSTEM FOR SIGNALING AN AQUAPLANING CONDITION OF A TYRE FITTED ON A VEHICLE

CROSS REFERENCE TO RELATED APPLICATIONS

This application is a national phase application based on PCT/IB2009/054673, filed Oct. 22, 2009, which claims the priority of Italian Application No. MI2008A001888, filed Oct. 24, 2008, and the benefit of U.S. Provisional Application No. 61/202,063, filed Jan. 26, 2009, the content of all of which is incorporated herein by reference.

BACKGROUND OF THE INVENTION

1. Field of the Invention

The present invention relates to a method and a system for signalling an aquaplaning condition of a tyre fitted on a vehicle.

2. Description of the Related Art

In the present context, by "aquaplaning" it is intended the condition at which a tyre fully loses its steering property due to the presence of a layer of water interposed between the tyre and the ground (or, more generally; the rolling surface of the tyre) So that, even if the driver of the vehicle on which the tyre is fitted makes attempts to modify the vehicle trajectory, the tyre goes on following the direction substantially dictated by the force of inertia without modifying its trajectory.

The aquaplaning condition occurs when draining and ejection of water in the tread channels and/or grooves, at the footprint area, becomes insufficient, giving rise to loss of grip by the tyre.

Therefore lifting of the tyre from the ground takes place exactly at the footprint area and, as a result, the tyre loses its steering property and traction capability.

The aquaplaning phenomenon can be very dangerous, because under such conditions a driver substantially loses the vehicle control and is no longer able to follow the road, avoid obstacles, etc.

The European patent application EP 1897706 discloses a method and a system for determining the conditions of the ground on which a tyre is rolling.

This document describes a' solution enabling the vibrations to which the tyre is submitted in the footprint area, the pre-footprint region ("pre-leading domain") and/or post-footprint region ("post-trailing domain") to be detected; subsequently, through a map of the prestored values relating the magnitudes derived from the detected vibrations with the ground conditions, it is determined whether the ground is of the type having a "high friction coefficient", a "medium friction coefficient" or a "low friction coefficient".

In the same European patent application, still as a function of the detected vibrational signal, it is disclosed that it is also possible to determine whether an agent such as water, snow or ice is interposed between the tyre and the ground.

SUMMARY OF THE INVENTION

The Applicant has perceived that it is possible to recognise the aquaplaning phenomenon, and in some cases to foresee it, starting from data detected from a tyre while it is rolling.

In particular, the Applicant has found that, in the presence of significant layers of water the tyre tends to become deformed with respect to a condition of normal interaction between the tyre and rolling surface.

Such a deformation gives rise in particular to a reduction of the footprint-area region and consequently a reduction of the grip between the tyre and rolling surface.

The Applicant has also noticed that this deformation can be advantageously measured by means of sensors placed inside the tyre, and that the measured deformation can be correlated with the arising of the aquaplaning phenomenon.

The Applicant has further found that the deformation due to passage of the tyre on the layer of water is also transmitted to regions of the tyre contiguous to the footprint area.

The Applicant has also ascertained that the deformation transmitted to the tyre region(s) contiguous to the footprint area can be advantageously detected by means of sensors disposed inside the tyre and can be correlated with the arising of the aquaplaning phenomenon.

The Applicant has therefore found that it is possible to draw one or more parameters representative of the deformation suffered by the tyre in the footprint area and/or transmitted to at least one of the tyre regions contiguous to the footprint area, and then correlate said parameters with the arising of the aquaplaning phenomenon.

In this way, by calculating and monitoring this parameter or parameters it is possible to monitor the tyre-road contact surface substantially in real time, and therefore the grip condition between tyre and rolling surface.

In particular, the Applicant has found that by detecting and processing a signal representative of a deformation of the inner surface of the tyre, it is possible to determine one or more parameters representative of the aquaplaning condition of the tyre, and thus monitor the possible arising of loss of grip and/or of the steering property of the tyre.

In greater detail, the Applicant has ascertained that, with reference to the aforesaid signal, there are two frequency fields in which it is possible to draw information that can be correlated with the aquaplaning condition of the tyre, a first low-frequency field ($f<700$ Hz) and a second high-frequency field ($f>700$ Hz, and preferably included between about 700 Hz and about 2000 Hz).

In the first frequency field, significant information can be drawn above all at the footprint area (i.e. the contact region between the tyre and the rolling surface), while in the second frequency field significant information can be drawn above all at the pre-footprint and/or post-footprint regions (that are external to the footprint area and respectively precede and/or follow the latter in the rolling direction of the tyre).

In accordance with a first aspect, the invention relates to a method of signalling an aquaplaning condition of a tyre, in which the latter is rolling on a rolling surface and a footprint area is defined between the tyre and the rolling surface, a layer of water being interposed between tyre and rolling surface, said method comprising:
  detecting at least one first signal representative of a deformation of said tyre due to rolling of said tyre on said rolling surface, said first signal comprising at least one portion representative of the interaction between the tyre and said layer of water;
  processing said first signal so as to determine at least one parameter representative of an aquaplaning condition of said tyre;
  generating a notification signal as a function of said at least one parameter.

In accordance with a second aspect, the invention relates to a system for signalling an aquaplaning condition of a tyre, in which the latter is rolling on a rolling surface and a footprint area is defined between the tyre and the rolling surface, a layer of water being interposed between the tyre and the rolling surface, said system comprising:

a detection device for detecting at least one first signal representative of a deformation of said tyre, due to rolling of said tyre on said rolling surface, said first signal comprising at least one portion representative of the interaction between the tyre and said layer of water;

at least one processing unit operatively associated with said detection device and adapted to process said first signal so as to determine at least one parameter representative of an aquaplaning condition of said tyre;

said at least one processing unit being further adapted to generate a notification signal as a function of said at least one parameter.

To the aims of the present invention, by "aquaplaning condition" it is intended a condition in which the tyre at least partly loses its grip on the rolling surface due to the presence of the layer of water on which it is passing. The aquaplaning condition can be partial or total: in the last-mentioned case the tyre fully loses its steering property while in the first case the tyre keeps its capability of interacting with the rolling surface at least partly.

Advantageously, the parameter or parameters determined on the basis of signals representative of the deformation suffered by the tyre by effect of its passing on the layer of water actually represent a measurement of the "distance" between the current aquaplaning condition of the tyre and the total aquaplaning condition, so as to enable notification of the possible approaching of a condition of danger, even greatly in advance.

Preferably, the tyre deformation that is taken into consideration is a deformation of the inner surface of said tyre.

In fact, the Applicant has found that the deformations suffered by the outer surface of the tyre due to the tyre passage on the layer of water affect the inner surface of said tyre to such an extent that it is ensured a sufficient accuracy in detecting the aquaplaning condition.

It is therefore possible to detect the information of interest by means of a detection device fitted on the inner surface of the tyre.

Preferably, for determining said at least one parameter representative of the aquaplaning condition, the first signal is filtered and processed in a predetermined frequency field.

In a first embodiment, the first signal can be filtered in a first frequency field greater than about 700 Hz, preferably included between about 700 Hz and 2000 Hz, more preferably included between about 1000 Hz and 1700 Hz; in other words, the first signal is analysed in a high frequency.

In particular, the high-frequency analysis is carried out on a signal portion corresponding to a predetermined extension region contiguous to the footprint area, preferably in a region following said footprint area in the rolling direction of the tyre.

In a second embodiment, the first signal can be filtered in a frequency field lower than about 700 Hz, preferably lower than 5-600 Hz. In other words, the first signal is analysed in a low frequency. Practically, for performing low-frequency analyses, a harmonic analysis of the first signal can be carried out (by a Fourier transform, for example) and a given number of harmonics of a lower order can be taken into account, such as the 20-30 first harmonics, for example.

Also taken into consideration can be low-frequency sub-ranges, such as the range included between the tenth and the twenty-fifth harmonics.

Preferably, the first signal is an accelerometric signal; in particular, a detection device can be used which is able to detect the radial, and/or longitudinal and/or lateral acceleration to which the inner surface of the tyre is submitted.

By processing this accelerometric signal through integration operations, it is then possible to obtain information about the deformation amounts and/or the variation speed of these deformations.

Further features and advantages will become more apparent from the detailed description of a preferred and non-limiting embodiment of the invention.

BRIEF DESCRIPTION OF THE DRAWINGS

This description is provided hereinafter with reference to the accompanying drawings, given by way of non-limiting example too, in which.

DETAILED DESCRIPTION OF THE INVENTION

With reference to the drawings, a tyre for vehicle wheels has been generally denoted at 1.

Tyre 1 (FIG. 1) is fitted on a rim 2, in turn fitted on a hub 3; through the hub 3, tyre 1 is mounted on a vehicle (not shown) to enable movement of same.

Figure 1:
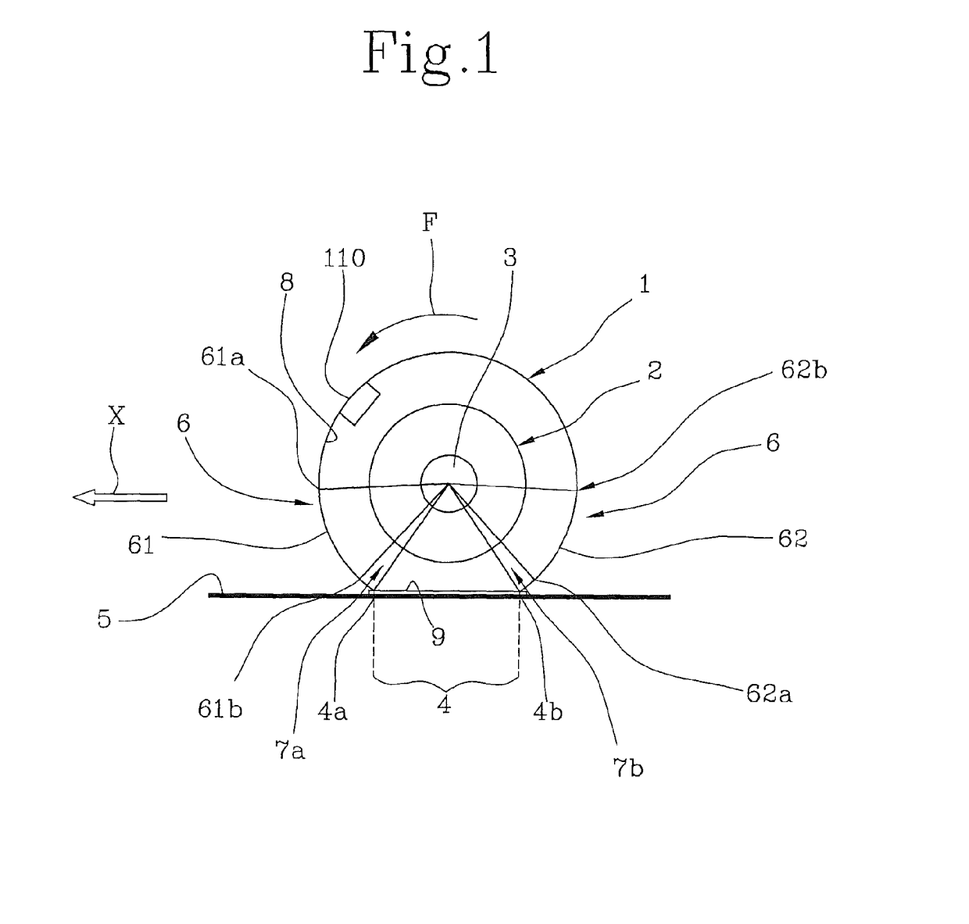
FIG. 1 diagrammatically shows a tyre used in the method and system in accordance with the invention.

While the vehicle is running, tyre 1 rolling on the rolling surface 5 (the ground, for example) is submitted to a displacement in a longitudinal direction X that is substantially parallel to the rolling surface 5 itself.

The rolling direction of tyre 1 is shown in FIG. 1 by arrow F.

As mentioned above, tyre 1 is in contact with the rolling surface 5 in the so-called "footprint area" 4; the latter is defined between a first and a second longitudinal end, 4a and 4b respectively.

In particular, between tyre 1 and the rolling surface 5 a layer of water 9 is interposed. Due to the presence of the layer of water 9, tyre 1 can reduce its grip on the ground (i.e. reduce the contact area between the tyre and the rolling surface) and the aquaplaning phenomenon may occur.

In other words, between tyre 1 and rolling surface 5 a footprint area 4 is defined, which is the region where tyre 1 (and in particular the radially external tyre surface or tread), and the rolling surface 5 are substantially in mutual contact, unless the aforesaid layer of water 9 is interposed between them.

Arising of the aquaplaning phenomenon can also depend on the rotation speed of tyre 1. The method of the invention can therefore comprise a step of detecting the tyre speed.

The rotation speed of tyre 1 can be, for example, determined as a function of the data supplied by a detection device (like the one to be described in the following and identified with reference numeral 110) fitted at the inside of tyre 1.

A detection region 6 that is external and substantially contiguous to the footprint area 4 is identified on tyre 1. Preferably, the detection region comprises a pre-footprint region 61 and a post-footprint region 62.

The pre-footprint region 61 is substantially contiguous to the footprint area 4 and precedes the latter in the rotation direction of tyre 1. Preferably, the pre-footprint region 61 has a first longitudinal end 61a, and a second longitudinal end 61b, said first and second longitudinal ends 61a, 61b defining a central angle of a width included between 25° and 65°. In greater detail, the first and second longitudinal ends 61a, 61b of the pre-footprint region 61 define a central angle of a width included between 40° and 50°.

The post-footprint region 62 is substantially contiguous to the footprint area 4 and follows the latter in the rotation direction of tyre 1. Preferably, the post-footprint region 62 has a first longitudinal end 62a and a second longitudinal end 62b, said first and second longitudinal ends 62a, 62b defining a central angle of a width included between 25° and 65°. More particularly, the first and second longitudinal ends 62a, 62b of the post-footprint region 62 define a central angle of a width included between 40° and 50°.

Advantageously, a first intermediate region 7a is provided between the first longitudinal end 4a of the footprint area 4 and the second longitudinal end 61b of the pre-footprint region 61.

The longitudinal ends of the first intermediate region 7a define a central angle of a width included between 3° and 10° and equal to about 5°, for example.

Preferably, the detection region 6 does not include the first intermediate region 7a.

Advantageously, a second intermediate region 7b is provided between the first longitudinal end 62a of the post-footprint region 62 and the second longitudinal end 4b of the footprint area 4.

The longitudinal ends of the second intermediate region 7b define a central angle of a width included between 3° and 10° and equal to about 5°, for example.

Preferably, the detection region does not include the second intermediate region 7b.

For identifying the footprint area 4 and pre-footprint and post-footprint regions 61 and 62, it is possible to proceed as hereinafter described by way of example.

A radial accelerometric signal is detected which corresponds to the radial deformation of the inner surface of tyre 1. This signal is typically sampled to a frequency included between 4000 Hz and 20000 Hz, a frequency of 10000 Hz, for example.

Then filtering of the low-pass type, below the thirtieth harmonic for example, is carried out so as to mainly emphasise the so-called macrodeformation, i.e. the tyre portion feeling the effects of the deformation due to deflection of the tyre itself around the footprint area.

The two absolute minima on a revolution of the radial accelerometric signal identify the longitudinal ends 4a, 4b of the footprint area 4.

Then, after determining the inverse of the angular resolution given by the sampling of the signal according to the following formula:

$$Ir = \frac{points\_per\_revolution}{360}$$

where Ir is the inverse of the angular resolution given by the sampling of the signal, and taking the already defined footprint area 4 as a reference, it is possible to identify the pre-footprint regions 61 and post-footprint regions 62 as the regions defining a predetermined central angle and spaced apart a predetermined angle (corresponding to the intermediate regions 7a-7b) from the ends of the footprint area 4.

The method according to the invention first of all comprises a step of detecting a first signal S1 representative of a deformation of tyre 1 caused by the presence of the layer of water 9.

In fact, the presence of layer 9 causes a deformation of tyre 1 capable of reducing the contact region of the footprint area 4 and promoting arising of the aquaplaning phenomenon.

The first signal S1 can be representative of the amount of the deformation, and/or the variation speed of the deformation, and/or the acceleration corresponding to the deformation.

Preferably, the first signal S1 is an accelerometric signal. Generally, the first signal S1 can be representative of a measurement carried out in a radial, and/or longitudinal, and/or, lateral direction of tyre 1.

Preferably, the deformation of which the first signal S1 is representative is a deformation of an inner surface 8 of tyre 1.

Figure 6A:
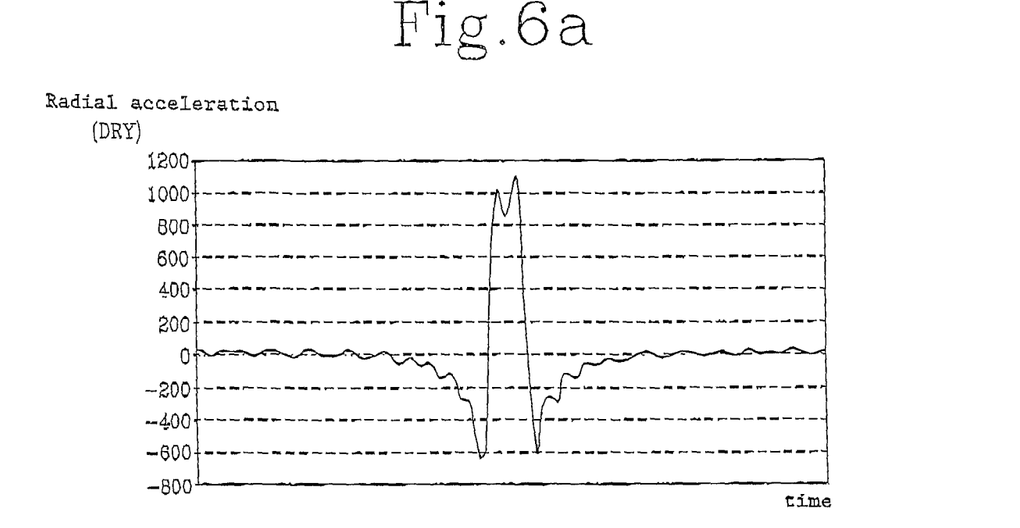
FIGS. 6a-6b show the variation as a function of time of further signals used in the method and system in accordance with the invention.
Figure 6B:
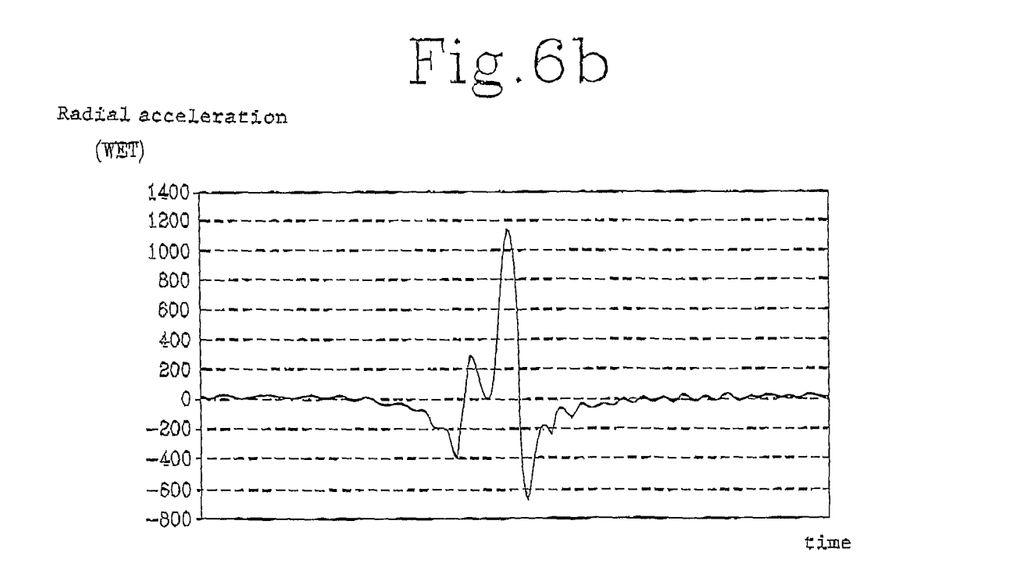

FIG. 6a shows the variation as a function of time of the radial acceleration detected by a device associated with the inner surface of a tyre along a wheel circle in the absence of the layer of water 9, while FIG. 6b shows the variation as a function of time of the radial acceleration detected by the same device along a wheel circle when the layer of water 9 is interposed between tyre 1 and the rolling surface 5.

It is possible to see the important variation intervening in the graph between the two cases; as better clarified in the following, this variation can be utilised for detecting and signalling the arising of the aquaplaning phenomenon.

FIGS. 8a-8c and 9a-9c show the development of the phenomenon in a more detailed manner.

Figure 8A:
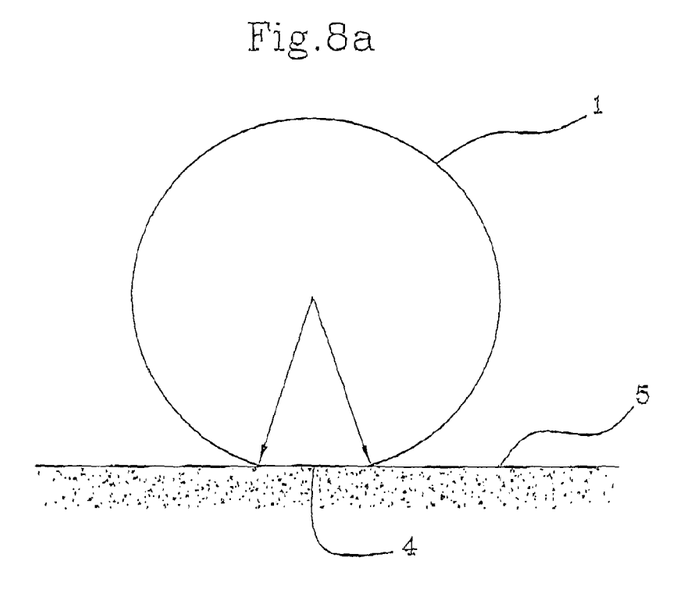
FIGS. 8a-8c diagrammatically show the evolution of the aquaplaning phenomenon.
Figure 8B:
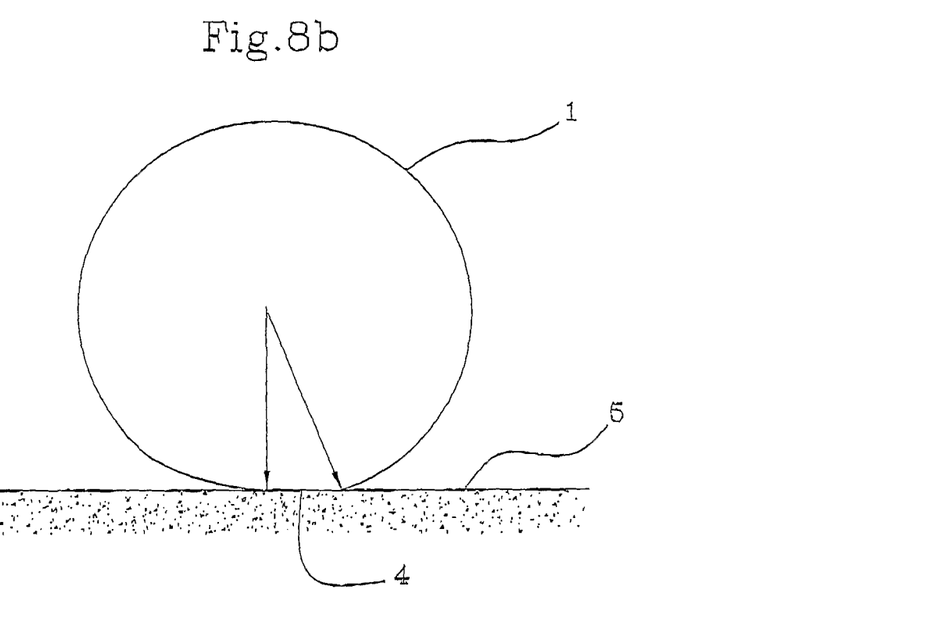
Figure 8C:
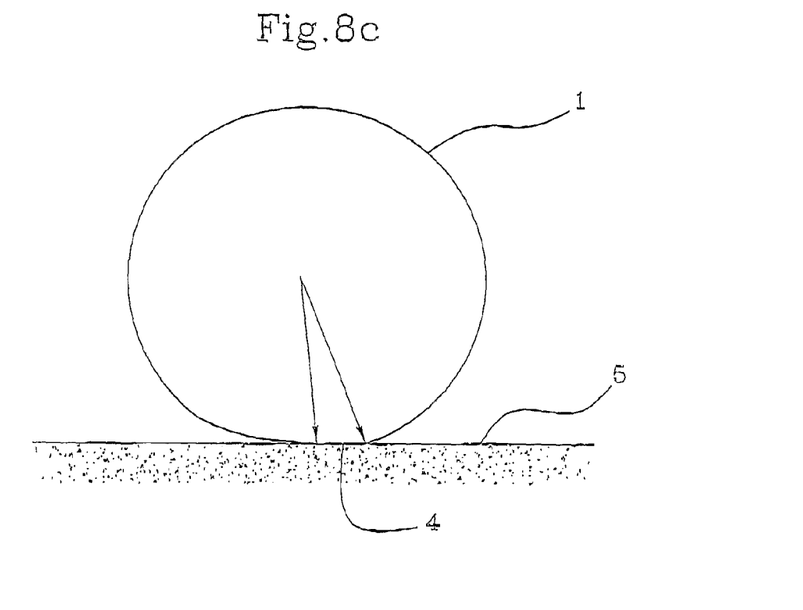
Figure 9A:
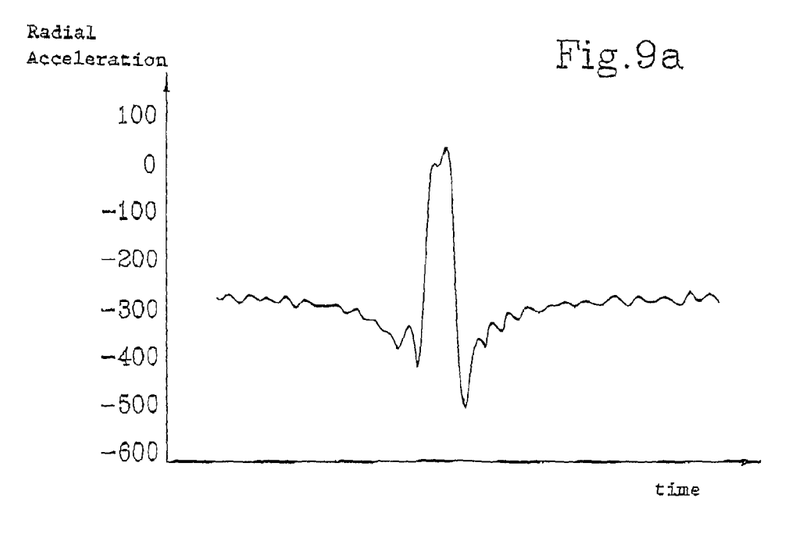
FIGS. 9a-9c show the progressive evolution in time of a signal used in the method and system of the invention, detected under different conditions represented in FIGS. 8a-8c.
Figure 9B:
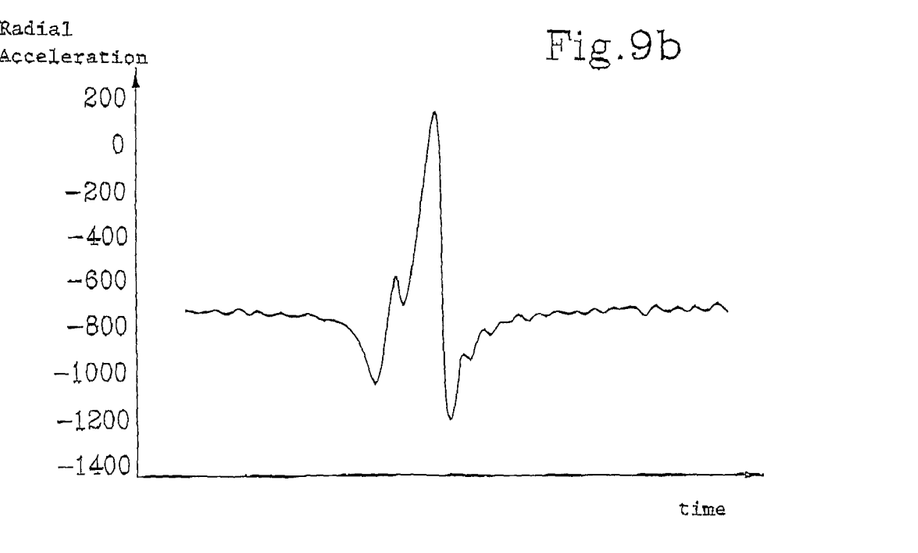
Figure 9C:
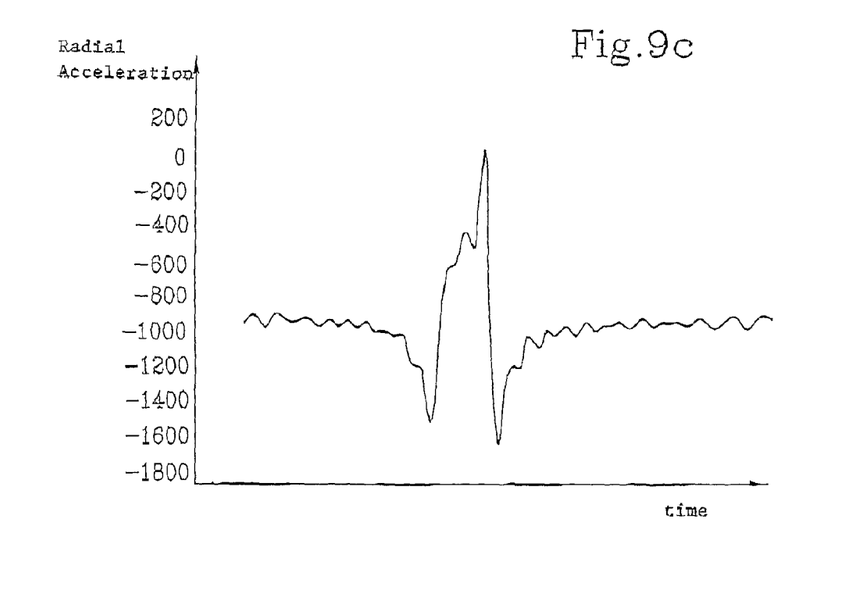

In particular, FIGS. 8a-8c diagrammatically show the progressive reduction in the tyre-road contact in the footprint area as the rolling speed of the tyre increases. FIGS. 9a-9c show the progressive variations suffered by the detected radial acceleration, under the conditions identified in the corresponding FIGS. 8a-8c.

Figure 2:
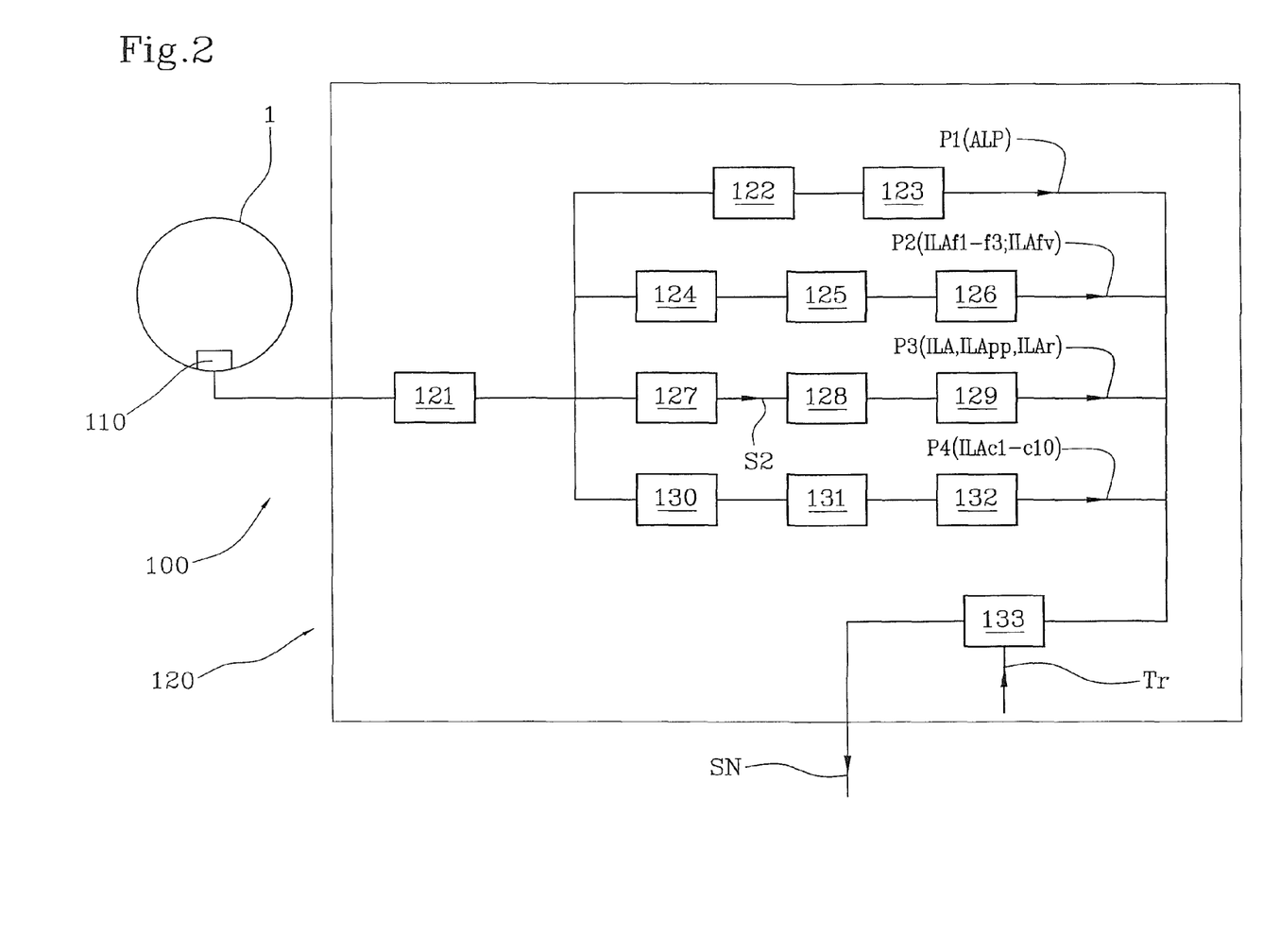
FIG. 2 is a block diagram of an embodiment of a system in accordance with the present invention.

The first signal S1 is preferably generated by a detection device 110, diagrammatically shown in FIGS. 1 and 2. The detection device 110 is part of a system 100 for determining an aquaplaning condition of tyre 1. System 100 is diagrammatically shown in FIG. 2.

The detection device 110 is preferably associated with the inner surface 8 of tyre 1; in particular the detection device 110 can be fastened to the liner of tyre 1, typically by an anchoring device. Preferably, fastening of this detection device 110 can substantially take place at the equatorial plane of tyre 1.

The detection device 110 can for example comprise an accelerometer adapted to detect the radial and/or longitudinal and/or lateral acceleration to which the inner surface 8 of tyre 1 is submitted.

Therefore, depending on the first signal S1, at least one parameter P1, P2, P3, P4 is determined which is representative of an aquaplaning condition of tyre 1.

Preferably, this step is performed by a processing unit (FIG. 2) operatively associated with said detection device 110. The processing unit 120 can be disposed inside tyre 1, or be located on board the vehicle and is able to receive the necessary data for carrying out the processing by wireless transmission from the detection device 110. Alternatively, a first part of the processing operation can be performed in a first processing unit placed inside the tyre and a second part of the processing operation can be performed by a second processing unit placed on board the vehicle and capable of receiving the data necessary to the second part of the processing operation through wireless transmission from the first processing unit.

With reference to FIG. 2, finally a notification signal SN is generated as a function of said at least one parameter.

This notification signal SN can be addressed to the driver of the vehicle on which tyre 1 is fitted so as to provide a warning about possible danger conditions that the vehicle may encounter due to arising of the aquaplaning phenomenon.

Additionally or alternatively, the notification signal SN can be addressed to an automatic system for vehicle control (not shown) to provide an automatic aid to driving in order to avoid the vehicle being in a condition too close to aquaplaning.

Advantageously, calculation of parameter P1, P2, P3, P4 and related processing are performed for each revolution of tyre 1, so that the information relating to the grip conditions is maintained updated in a sufficiently frequent and reliable manner. It may be also convenient to execute an average of the value of said at least one parameter detected in a given number of revolutions of the tyre.

Once the first signal S1 has been detected, the same is preferably sampled, in particular at a frequency included between 4000 Hz and 20000 Hz, and equal to 10000 Hz for example.

In system 100 (FIG. 2) the sampling of the first signal S1 is performed by a sampling module 121.

Different types of analyses and processing operations can be carried out on the first signal S1 for drawing the data of interest.

For instance, an analysis at "high frequency" (frequencies higher than 700 Hz) and/or an analysis at "low frequency" (lower than 700 Hz) can be performed.

In particular, by a low-frequency filtering and/or an analysis of the low-order harmonics of signal S1, it is possible to monitor the so-called "macrodeformation" of tyre 1 (or of the liner of tyre 1), or the deformation caused by deflection of tyre 1 in the region around the contact area between tyre and rolling surface (inclusive of the contact region itself) and how it is modified by effect of the tyre passing on the layer of water.

On the contrary, through a high-frequency analysis, it is possible to monitor how the high-order harmonics are influenced due to the presence of the layer of water.

In both cases, it has been found that it is possible to determine one or more parameters that can be correlated with the arising of the aquaplaning phenomenon.

Preferably, for performing a high-frequency analysis, the first signal S1 is filtered in a first frequency band B1, included between 700 Hz and 2000 Hz; more particularly, this first band B1 can be included between 1000 Hz and 1700 Hz.

With reference to system 100 (FIG. 2), this filtering step is carried out by a first filtering module 122 being part of the processing unit 120.

Preferably, the high-frequency analysis of the first signal S1 can be carried out in a portion representative of a deformation of the inner surface 8 of tyre 1 at the outer region 6 contiguous to the footprint area 4 of predetermined extension. This outer region 6 can, in particular, comprise the aforesaid post-footprint region 62.

A first parameter P1 representative of an aquaplaning condition of tyre 1 can thus be obtained as a function of a mean value of the amplitudes of the first signal S1 filtered in the first frequency band B1, in its portion corresponding to the region contiguous to the footprint area 4. The operation for calculating the mean value can be carried out on the amplitudes of the samples resulting from the sampling and filtering operations of signal S1.

It is to be noted that in the present context and the following claims, by "mean value" it is intended any type of average of the amplitudes of the considered assembly of samples; this average can be, for example, an arithmetic average, a geometric average, a root mean square value, an average calculated on the absolute value or absolute values of the considered magnitudes, etc.

In a particularly preferred embodiment, the first parameter P1 is obtained as a function of a root mean square value of the amplitudes of said samples.

In system 100, a first computing module 123, connected downstream of said first filtering module 122, determines the first parameter P1.

For instance, the first parameter P1 can be calculated according to the following formula:

$$ALP = \frac{\sqrt{\sum_{i=1}^{M} acc_{POST}(i)_{B1}^2}}{\max}$$

wherein:
ALP is the first parameter P1;
$acc_{POST}(i)_{B1}$ is the amplitude of the i-th sample obtained from a sampling of said first signal S1, filtered in the first frequency band B1;
M is the number of samples present in a signal portion S1 corresponding to a region contiguous to the footprint area 4 of tyre 1 of a pre-established extension, as described above;
max is the maximum value that the square root of the sum of the amplitude squares of said samples (i.e. the amount put at the numerator of the above formula) can take when tyre 1 is in a total-aquaplaning condition.

The above reproduced parameter ALP can supply, for instance as a percentage, the level reached by the current aquaplaning condition relative to the total-aquaplaning condition. The greater the value of ALP is, the greater the danger level.

Figure 7:
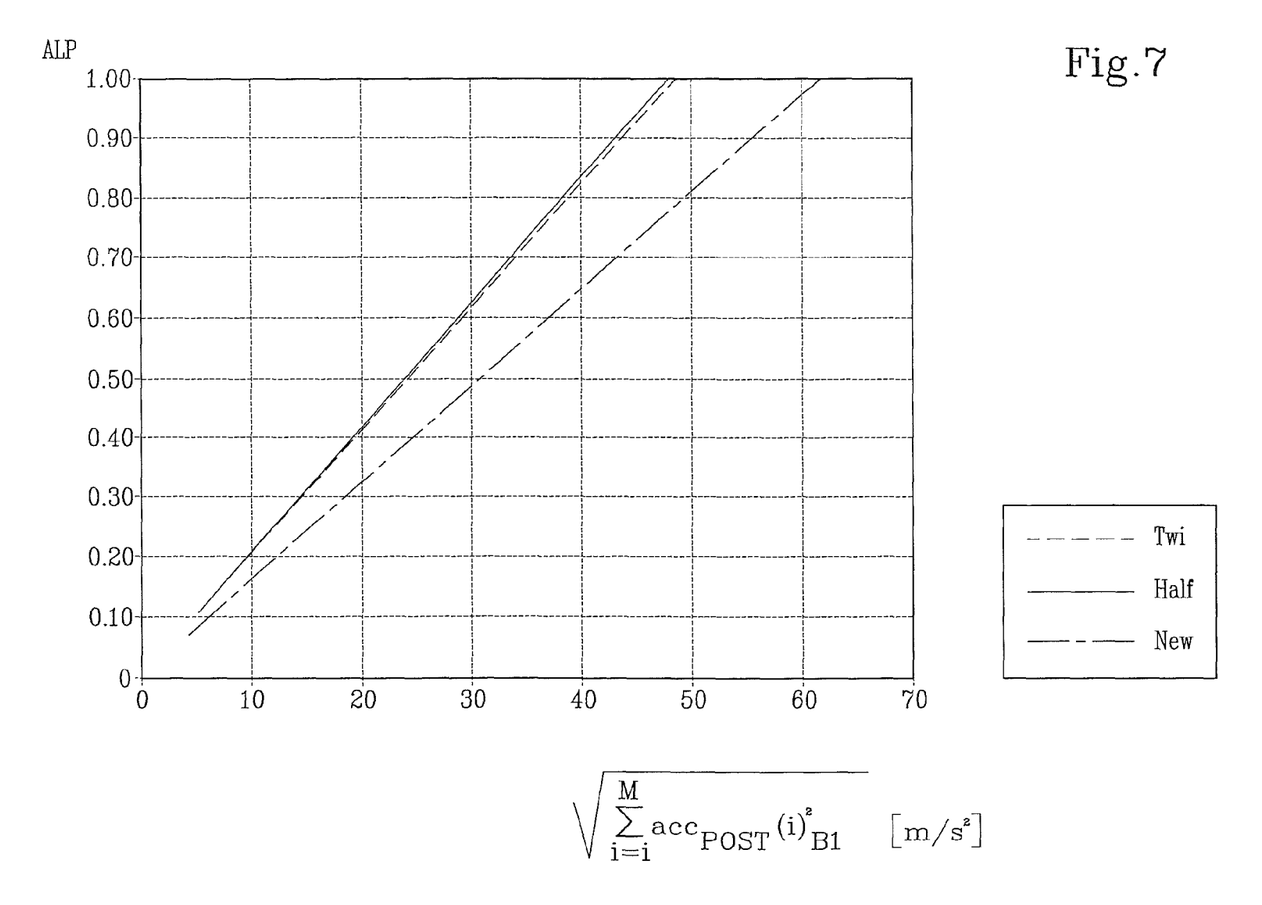
FIG. 7 shows the correlation between a parameter used in the method and system in accordance with the invention, and the aquaplaning condition in which the vehicle can be.

FIG. 7 diagrammatically shows the variation of parameter ALP as a function of the value of the amount put at the numerator of the above formula.

It is possible to notice that, as this amount increases, the parameter value increases as well and approaches the condition of total aquaplaning in which ALP is equal to 1, in a substantially linear manner.

For instance, a reference threshold can be defined for values equal to 0.6-0.7, beyond which the vehicle can start losing its steering property and grip in a very dangerous manner.

It should be noted that the graph has different curves relating to different wear conditions of the tyre: curve "NEW" refers to a new tyre, curve "HALF" refer to a tyre that is in the middle of its useful life (wear of about 50%), curve "TWI" refers to a totally worn-out tyre.

As above mentioned, starting from the first signal S1 it is also possible to carry out a low-frequency analysis.

Preferably, the portion of the first signal S1 is considered, which is representative of the deformation of the inner surface 8 of tyre 1 at the footprint area 4.

The first signal S1 is then filtered in a second frequency band B2 typically lower than 700 Hz. Preferably, the frequency band B2 can be obtained by multiplying the frequency value corresponding to the angular speed ω of tyre 1 by a factor not higher than 30, preferably not higher than 25. Which means that practically the first 25-30 harmonics of the first signal S1 are considered.

In system 100, this filtering step is performed by a second filtering module 124, being part of the processing unit 120.

A second parameter P2 can therefore be obtained starting from identification of some significant points of the signal portion S1 corresponding to the footprint area 4.

Figure 3:
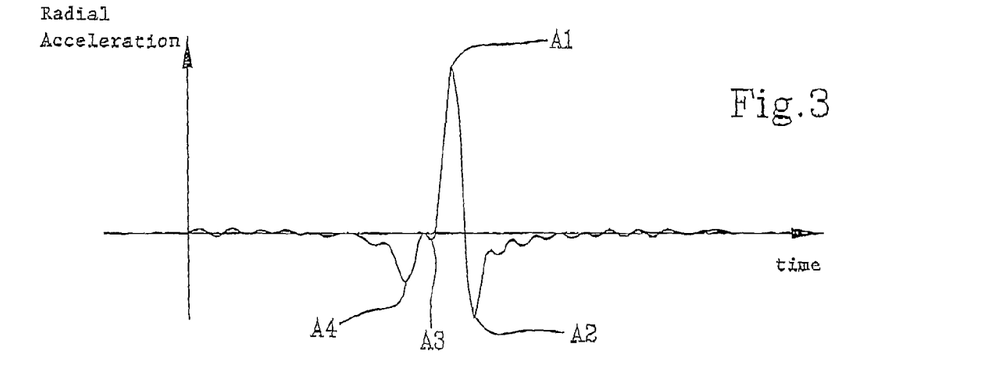
FIGS. 3-5 show the variation as a function of time of examples of signals used in the method and system in accordance with the invention.
Figure 4:
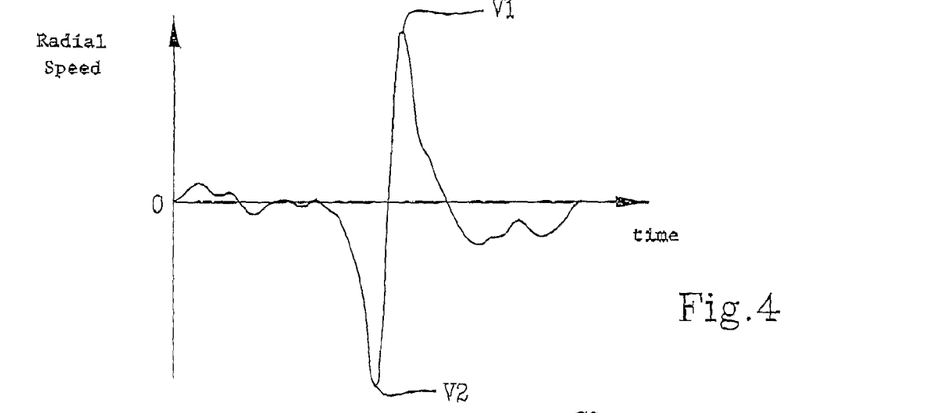

FIGS. 3 and 4 show, by way of example, curves representing the variation in time of the first signal S1 (reproduced in FIG. 3 is an acceleration signal, in FIG. 4 a speed signal) after said signal has been filtered as specified above.

At least some significant points included in the signal portion S1 corresponding to the footprint area 4 have been identified on said curves; these significant points are selected from the group comprising: absolute-maximum point A1 of the acceleration; absolute-maximum point V1 of the speed; first minimum point A2 of the acceleration in time subsequent to said absolute maximum A1; first minimum point A3 of the acceleration in time preceding said maximum absolute A1; second minimum point A4 of the acceleration in time preceding said absolute maximum A1; said second minimum point preceding in time said first minimum point A3 preceding the maximum-absolute point; absolute-minimum point V2 of the speed.

FIG. 3 diagrammatically shows the variation as a function of time of the acceleration corresponding to the deformation in a radial direction, detected on the inner surface 8 of tyre 1 after passage on a layer of water, in which the significant points A1-A4 can be identified. These points A1-A4 appear to be particularly representative of the deformation suffered by the tyre in the footprint area on passing on the layer of water.

Referring again to FIGS. 6a-6b, in which the difference between radial acceleration on a dry surface and radial acceleration on a wet surface is highlighted, it is possible to see that the position and/or amplitude of points A1-A4 is modified by effect of the presence of the layer of water. This makes it possible to correlate the position and/or amplitude of these points with the possible arising of the aquaplaning phenomenon.

FIG. 4 diagrammatically shows the course as a function of time of the variation speed of the deformation in a radial direction, detected on the inner surface 8 of tyre 1 after passage on a layer of water, in which the significant points V1-V2 can be identified. It has been also found that these points V1-V2 appear to be particularly representative of the deformation suffered by the tyre in the footprint area on passing on the layer of water.

The course of the radial-deformation speed can be for example obtained through integration of the first accelerometric signal S1.

In system 100, a first analysis module 125 being part of the processing unit 120, is entrusted with the task of identifying the significant points A1-A4, V1-V2.

The second parameter P2 can therefore be calculated as a function of one or more mutual distances between the abscissae and/or the ordinates of pairs of significant points A1-A4, V1-V2.

For instance, the second parameter P2 can be determined in accordance with one or more of the following formulae:

$$ILA\_f1 = \frac{LW}{LI} \cdot 100$$

wherein:
the second parameter P2 is ILA f1;
LW represents the modulus of the difference between the abscissa of the first minimum point (A3) preceding in time the absolute-maximum point of the acceleration A1, and the abscissa of the second minimum point A4 preceding in time said absolute-maximum point A1;
LI represents the modulus of the difference between the abscissa of the absolute-maximum point A1, and the abscissa of the second minimum point A4 preceding in time said absolute-maximum point;

$$ILA\_f2 = \frac{LW}{LIc} \cdot 100$$

wherein:
the second parameter P2 is ILA f2;
LW represents the same parameter as described above;
LIc represents the modulus of the difference between the abscissa of the first minimum point A2 subsequent in time to the absolute-maximum point A1, and the abscissa of the second minimum point A4 preceding in time said absolute-maximum point A1;

$$ILA\_f3 = \frac{YT}{YG}$$

wherein:
the second er P2 is ILA f3;
YT represents the modulus of the difference between the ordinate of the absolute-maximum point A1 and the ordinate of the first minimum point A2 subsequent in time to the absolute-maximum point A1;
YG represents the modulus of the difference between the ordinate of the absolute-maximum point A1 and the ordinate of the first minimum point A3 preceding in time the absolute-maximum point A1;

$$ILA\_fv = \frac{YB}{|YA|}$$

wherein:
the second parameter P2 is ILA fv
YB represents the ordinate of the absolute-maximum point V1;
YA represents the ordinate of the absolute-minimum point V2.

In system 100, calculation for determining the second parameter P2, following the above stated formulae for example, is performed by a second computing module 126 being part of the processing unit 120 and connected downstream of the aforesaid analysis module.

A further analysis can be performed starting from a speed corresponding to the radial deformation of the inner surface 8 of tyre 1 in the footprint area 4.

This deformation speed can be either directly detected through the detection device 100 (should it be able to measure speeds) or obtained by suitably processing the first signal S1 through the processing unit 120.

In fact, assuming that the first signal S1 is of the accelerometric type, and in particular representative of the acceleration corresponding to the radial deformation of the inner surface 8 of tyre 1, it is sufficient to integrate this first signal S1 with respect to time for obtaining said deformation speed.

Irrespective of how this information about speed is obtained, for the sake of clarity reference will be made hereinafter to a "second signal S2" representative of the radial-deformation speed of the inner surface 8 of tyre 1. This second signal S2 can be therefore either directly detected by the detection device 110 or obtained by processing (integrating, for example) the first signal S1.

By way of example only, FIG. 2 shows an operating module 127 preferably consisting of an integration module enabling the second signal S2 to be obtained as a function of said first signal S1.

The second signal S2 is preferably filtered in a third frequency band B3 with frequencies lower than 700 Hz, defined between a first frequency and a second frequency corresponding to low-order harmonics (corresponding to the thirtieth harmonic at most, for example). By way of example, the first frequency can correspond to the angular speed ω of tyre 1 multiplied by a factor greater than or equal to 10 (i.e. the tenth harmonic) and the second frequency can correspond to the angular speed ω of tyre 1 multiplied by a factor smaller than or equal to 25 (i.e. the twenty-fifth harmonic).

In system 100, this filtering step is performed by a third filtering module 128.

Then a third parameter P3 can be calculated following one or more of the following formulae:

$$ILA = \frac{\sqrt{\sum_{i=1}^{M} vel(i)_{10-25}^2}}{\omega}$$

wherein:
the third parameter P3 is ILA;
M is the number of the obtained samples coming out of he third filtering module 128 in the footprint area 4;
$vel(i)_{(10-25)}$ is the amplitude of the obtained i-th sample coming out of the third filtering module 128;
ω is the angular speed of tyre 1;

$$ILAapp = \frac{\max(vel_{10-25}) - \min(vel_{10-25})}{\omega}$$

wherein:
the third parameter P3 is ILApp;
$\max(vel_{10-25})$ is the maximum value measured for the speed corresponding to the deformation identified by the signal filtered by the third filtering module 128;
$\min(vel_{10-25})$ is the minimum value measured for the speed corresponding to the deformation identified by the signal filtered by the third filtering module;

$$ILAr = \frac{\sqrt{\sum_{i=1}^{M} vel_A(i)_{(10-25)}^2}}{\sqrt{\sum_{i=1}^{M} vel_B(i)_{(10-25)}^2}}$$

wherein:
the third parameter P3 is ILAr;
$vel_A(i)$ is the i-th sample of the deformation speed evaluated in region 6, external and contiguous to the footprint area 4, filtered by the third filtering module 128;

$vel_B(i)$ is the i-th sample of the deformation speed evaluated in the footprint area 4, filtered by the filtering module 128.

In system 100, the calculation for determining the third parameter P3 based on the formulae reproduced above is carried out by a third computing module 129 being part of the processing unit 120.

A further processing can be performed by filtering the accelerometric signal S1 in a fourth frequency band B4, defined in a low-frequency range, included between the tenth and the twenty-fifth harmonics, for example.

In system 100, this filtering operation is performed by a fourth filtering module 130.

Figure 5:
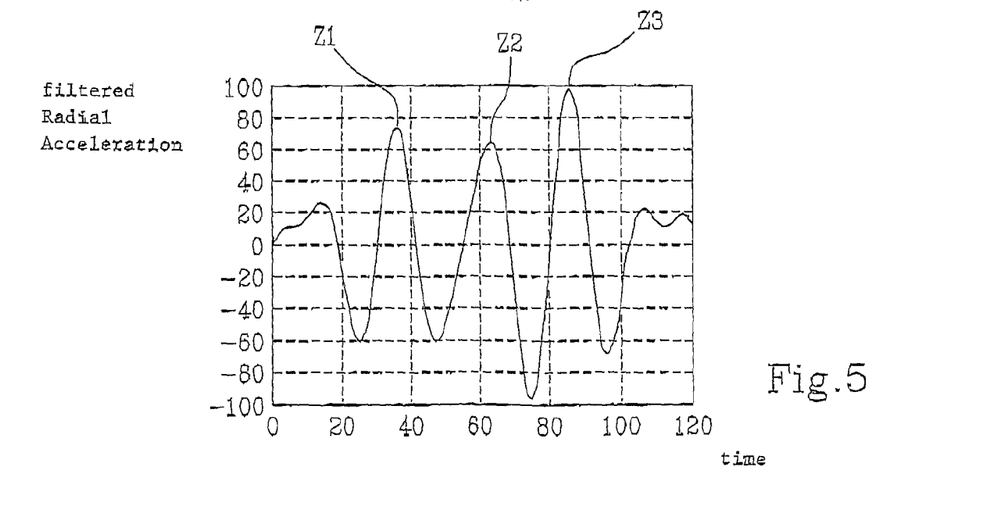

FIG. 5 shows a curve representative of the course in time of the first signal S1, after it has been filtered by the fourth filtering module 130.

In this case, the first signal S1 represents the radial acceleration corresponding to the deformation of the inner surface 8 of tyre 1.

It is possible to see that this curve at the footprint area 4 has a first peak Z1, a second peak Z2 and a third peak Z3, respectively.

Note that in the present context and in the following claims, by "peak" it is intended a relative-maximum point of a curve.

In particular, in the curve representing the first filtered signal S1, the three mentioned peaks Z1-Z3 are such disposed that the first peak Z1 precedes the second peak Z2 and the third peak Z3 in time, and the second peak Z2 precedes the third peak Z3.

Preferably, a fourth parameter P4 is determined as a function of one or more distances between the abscissae and/or the ordinates of such peaks Z1-Z3.

In particular, if in each pair the abscissae and ordinates of points Z1, Z2, Z3 are identified with $(X_{Z1}, Y_{Z1})$, $(X_{Z2}, Y_{Z2})$, $(X_{Z3}, Y_{Z3})$, the fourth parameter P4 can be calculated following one or more of the following formulae:

$$ILAc1 = Y_{Z2} - Y_{Z1}$$

$$ILAc2 = Y_{Z2} - Y_{Z3}$$

$$ILAc3 = (ILAc1 + ILAc2)/2$$

$$ILAc4 = \frac{Y_{Z2} - Y_{Z1}}{X_{Z2} - X_{Z1}}$$

$$ILAc5 = \frac{Y_{Z3} - Y_{Z2}}{X_{Z3} - X_{Z2}}$$

$$ILAc6 = \frac{\left|\frac{Y_{Z2} - Y_{Z1}}{X_{Z2} - X_{Z1}}\right| + \left|\frac{Y_{Z3} - Y_{Z2}}{X_{Z3} - X_{Z2}}\right|}{2} \times \text{sgn}\left(\frac{Y_{Z2} - Y_{Z1}}{X_{Z2} - X_{Z1}}\right)$$

$$ILAc7 = X_{Z2} - X_{Z1}$$

$$ILAc8 = X_{Z3} - X_{Z2}$$

$$ILAc9 = X_{Z3} - X_{Z1}$$

$$ILAc10 = Y_{Z3} - Y_{Z1}$$

where ILAc1, ILAc2, ILAc3, ILAc4, ILAc5, ILAc6, ILAc7, ILAc8, ILAc9, and ILAc10 are each fourth parameter P4.

In system 100, identification of peaks Z1-Z3 is performed by a second analysis module 131 and determination of the fourth parameter P4 as a function of said peaks is performed by a fourth computing module 132.

Once the parameter or parameters representative of the aquaplaning condition of the tyre have been calculated according to one or more of the above reproduced formulae, a comparison can be carried out between each calculated parameter and a respective preset threshold value Tr.

The aforesaid notification signal SN can therefore be generated as a function of said comparison.

For instance, the threshold value Tr can be representative of a condition of weak grip in which tyre 1 can be, due to the presence of the layer of water; should the first parameter P1 exceed this threshold Tr, the driver and/or the automatic control system of the vehicle are suitably informed, so that they can face the situation of potential danger before the tyre is in a total aquaplaning condition.

Advantageously, in system 100 this comparison step can be performed by a comparison module 133 being part of the processing unit 120.

Preferably, in order to obtain as much as possible reliable results, the aforesaid parameters P1, P2, P3, P4 can also be calculated in different ways (following two or more of the above quoted formulae, for example) and the different results can be compared with each other. For instance, generation of the notification signal could take place, should all or most of such results be substantially in accord, as regards a danger condition.

Note that the processing unit 120 has been described as divided into a plurality of modules only for the purpose of clarifying the different functionalities thereof; this division does not necessarily reflect the hardware structure of the processing unit 120. In particular, many of the modules shown in the processing unit 120 in FIG. 2 can actually correspond to a routine software.

Practically, the processing unit 120 can be made as a single programmable electronic device, suitably arranged for performing the different operations described above.

In a further embodiment, the detection device comprises at least two sensors, preferably three sensors, in particular of the accelerometric type.

The three sensors can be located on the inner surface 8 of tyre 1; in greater detail, a first sensor is located at the equatorial plane of tyre 1, while a second and a third sensor are disposed in side by side relationship with the first sensor and positioned on opposite sides relative to the latter. Preferably, the second and third sensors take up substantially symmetric positions with respect to the equatorial plane of tyre 1. Preferably, the three sensors are disposed substantially in the same meridian plane of the tyre.

Said three sensors are each connected to the processing unit 120 in such a manner that the signals supplied by each of them can be processed as above described. Therefore there will be three series of processing operations that can be performed substantially in parallel, each of them providing a respective result.

In this way reliability and accuracy of the method and system according to the invention can be improved, since the aquaplaning phenomenon typically starts in the central region of the tyre (i.e. substantially at the equatorial plane), and then extends to the sides, so that use of three sensors disposed as above stated allows the evolution of the phenomenon to be monitored with the greatest accuracy.

The invention claimed is:

1. A system capable of signalling an aquaplaning condition of a tyre, the tyre rolling on a rolling surface, a footprint area being defined between said tyre and said rolling surface, a layer of water being interposed between said tyre and said rolling surface, the system comprising:
a detection device for detecting a first signal representative of a deformation of said tyre due to rolling of said tyre on said rolling surface, said first signal comprising at least one portion representative of an interaction between the tyre and said layer of water; and
at least one processing unit operatively associated with said detection device and capable of being adapted to process said first signal so as to determine at least one parameter representative of an aquaplaning condition of said tyre,
wherein said at least one processing unit is adapted to identity said at least one portion of the first signal, said at least one portion being representative of a deformation of an inner surface of the tyre in a region that is external to said footprint area and substantially contiguous to said footprint area;
wherein said at least one processing unit comprises a first filtering module for filtering said at least one portion of the first signal in a first frequency band included between 700 Hz and 2000 Hz;
said at least one processing unit capable of being further adapted to generate a notification signal as a function of said at least one parameter; and wherein said at least one processing unit comprises a first computing module for determining said at least one parameter as a function of amplitudes of a plurality of samples within said at least one portion of the first signal filtered in the first frequency band, the plurality of samples being obtained through a sampling of the first signal.

2. The system as claimed in claim 1, wherein said at least one parameter is representative of a deformation of the inner surface of said tyre.

3. The system as claimed in claim 1, wherein said at least one processing unit comprises a sampling module for sampling said first signal to a predetermined sampling frequency.

4. The system as claimed in claim 3, wherein said first frequency band is between 1000 Hz and 1700 Hz.

5. The system as claimed in claim 1, wherein said region is a post-footprint region that is substantially contiguous to the footprint area and subsequent to the footprint area in a rotation direction of the tyre.

6. The system as claimed in claim 5, wherein said post-footprint region has a first longitudinal end and a second longitudinal end, said first and second longitudinal ends defining a central angle between 25° and 65°.

7. The system as claimed in claim 6, wherein the first and second longitudinal ends of said post-footprint region define a central angle between 40° and 50°.

8. The system as claimed in claim 5, wherein said first signal portion is representative of an acceleration corresponding to a radial and/or longitudinal and/or lateral deformation of said inner surface of the tyre in the post-footprint region.

9. The system as claimed in claim 1, wherein said at leas one processing unit comprises:
the first computing module for determining said at least one parameter as a function of a mean value of an amplitude of said first signal in said portion.

10. The system as claimed in claim 9, wherein said at least one parameter is a function of a root mean square value of the amplitude of said first signal in said portion.

11. The system as claimed in claim 9, wherein said first computing module determines said at least one parameter according to the formula:

$$ALP = \frac{\sqrt{\sum_{i=1}^{M} acc_{POST}(i)_{B1}^2}}{\max}$$

wherein:

ALP is said at least one parameter;

$acc_{POST}(i)_{B1}$ is an amplitude of an i-th sample obtained through a sampling of said first signal filtered in the first frequency band;

M is a number of samples present in a signal portion corresponding to said region contiguous to the footprint area of the tyre; and max is a predetermined value corresponding to a maximum value that a square root of a sum of an amplitude squares of said samples can take when said tyre is in a total-aquaplaning condition.

12. The system as claimed in claim 2, wherein said first signal is representative of an acceleration or speed corresponding to radial deformation of said inner surface.

13. The system as claimed in claim 1, wherein said at least one processing unit comprises:

a comparison module for comparing said at least one parameter with a preset threshold value, said at least one processing unit capable of being adapted to generate said notification signal as a function of said comparison.

14. The system as claimed in claim 13, wherein said preset threshold value is representative of a threshold between a total-aquaplaning condition and a grip condition to the rolling surface of said tyre.

* * * * *

UNITED STATES PATENT AND TRADEMARK OFFICE
CERTIFICATE OF CORRECTION

| | | |
|---|---|---|
| PATENT NO. | : 9,043,112 B2 | Page 1 of 1 |
| APPLICATION NO. | : 13/125439 | |
| DATED | : May 26, 2015 | |
| INVENTOR(S) | : Massimo Brusarosco et al. | |

It is certified that error appears in the above-identified patent and that said Letters Patent is hereby corrected as shown below:

In the claims,
Claim 9, col. 14, line 50, "at leas" should read --at least--.

Signed and Sealed this
Fifteenth Day of March, 2016

Michelle K. Lee
*Director of the United States Patent and Trademark Office*